United States Patent Office 2,732,397
Patented Jan. 24, 1956

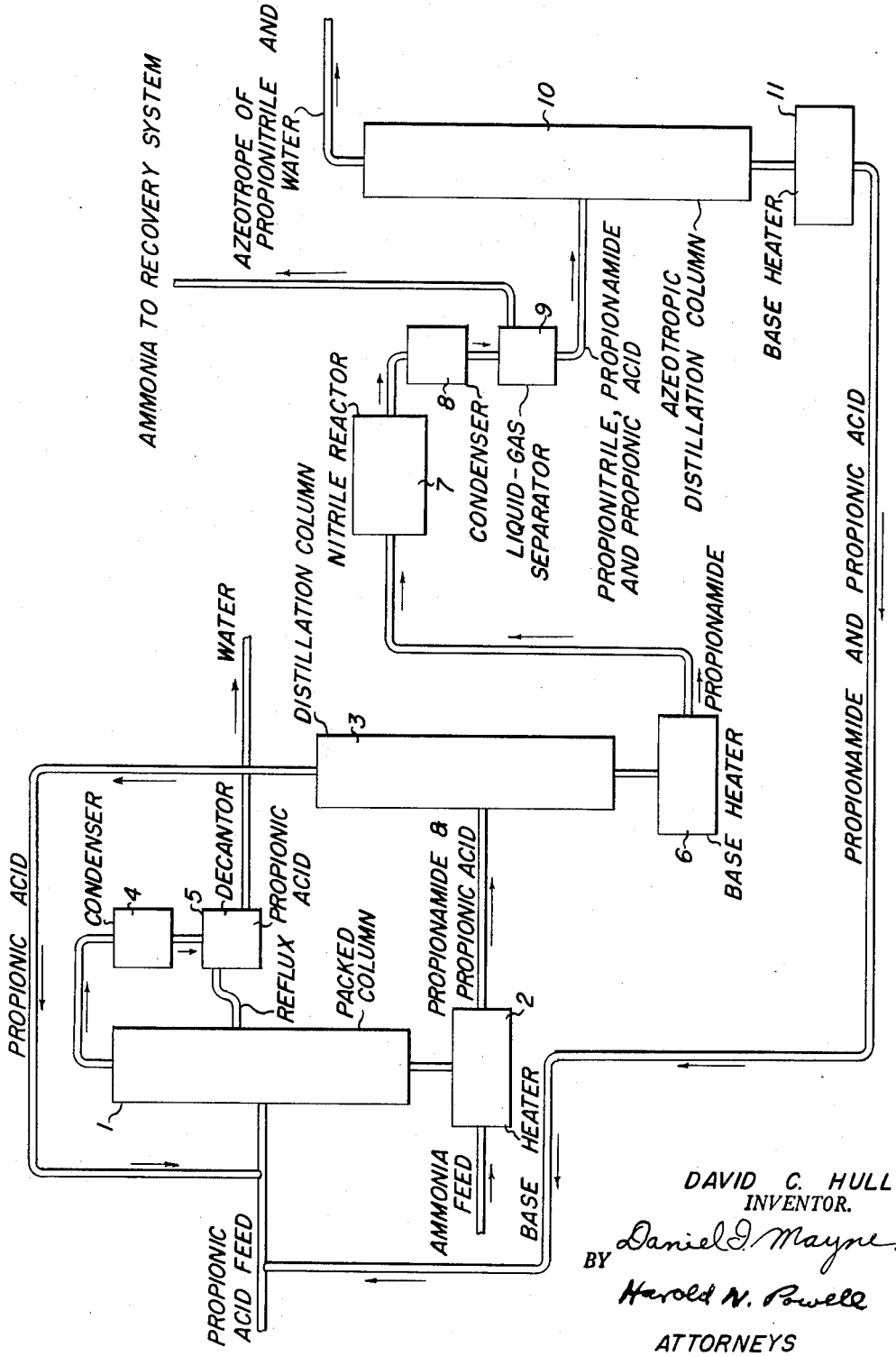

2,732,397

PREPARATION OF ALIPHATIC NITRILES

David C. Hull, Longview, Tex., assignor to Eastman Kodak Company, Rochester, N. Y., a corporation of New Jersey Application May 5, 1953, Serial No. 353,051

9 Claims. (Cl. 260—465.2)

This invention relates to the production of aliphatic nitriles by the reaction of aliphatic acids with ammonia and more particularly to an improved process for the production of propionitrile by the reaction of propionic acid with ammonia.

The production of nitriles by interaction of aliphatic acids with ammonia is of course well known. For example, the catalytic dehydration of the nascent amide formed by the direct reaction of a lower aliphatic carboxylic acid with ammonia in the presence of a support such as thoria, alumina, and silica gel has been studied by Reid et al., JACS, 28 1067 (1924), and JACS, 53 321 (1931). These investigators have found that an equilibrium concentration of 80–85% nitrile is obtained at 500° C. The preparation of propionitrile by the reaction of propionic acid and ammonia was studied by Abe; Wased Applied Chem. Soc. Bul., 19, 8–14 (1933), and the reaction was carried out over the Japanese acid clay, silica gel and aluminum oxide. The formation of nitriles is also the subject of U. S. Patents 2,200,734; 2,177,619; 2,369,061; and 2,273,633.

This invention has as an object to provide an improved process for the preparation of aliphatic nitriles. Another object is to provide a process for the production of aliphatic nitriles in improved yields and with minimization of side reactions. A further object is to provide such a process in which the formation of ketones is substantially eliminated or minimized. A still further object is to provide a process for the formation of aliphatic nitriles wherein preliminary removal of water reduces the amount of hydrolysis in the nitrile forming step. Another object is to provide a process which substantially eliminates recovery problems and markedly increases the capacity of the nitrile reaction vessel. Still another object is to provide a two-step process for the production of aliphatic nitriles from ammonia and aliphatic carboxylic acids wherein an amide is formed in the liquid phase in one step and the amide is thereafter dehydrated in a second step. Other objects will appear hereinafter.

These objects are accomplished by the following invention which, in its broader aspects, involves the carrying out of the amide-forming reaction and the subsequent nitrile-forming reaction in separate steps and wherein the water formed in the first step is removed in that step and the water formed in the second step is azeotroped out with nitrile product. My invention will be more fully elucidated by reference to the reaction involved.

The formation of nitriles by the reaction of aliphatic carboxylic acids with ammonia in the presence of suitable catalysts is reported in the prior art. The reactions which take place can be represented as follows:

(1) $RCOOH + NH_3 \rightarrow RCONH_2 + H_2O$
(2) $R-CONH_2 \rightarrow R-CN + H_2O$

It has been noted in the prior art that even where excess aliphatic carboxylic acid is employed, an equilibrium results and generally the maximum conversion to nitrile is of the order of 80–85%. The recovery of acid and amide from the water layer is a major problem. This is particularly true where the aliphatic acid azeotropes with water. In the present process I have provided an alternate method which eliminates this recovery problem by reacting ammonia and the acid in the liquid phase to form the amide and dehydrating the amide to the nitrile in a second step. By operating in this manner the recovery problem is substantially eliminated or minimized by removing water over the top in the first step and practically no additional processing of the nitrile product is required. In addition to eliminating the recovery problem, the capacity of the nitrile reactor is thus doubled.

Another outstanding advantage of my improved process is that it avoids or reduces the formation of by-product ketones. In the previously known direct conversion process ketones are formed by thermal decomposition of the free acid in the presence of typical dehydration catalysts, such as metal oxides:

$$R-COOH \xrightarrow[\text{Catalyst}]{\text{Metal Oxide}} R_2CO + CO_2 + H_2O$$

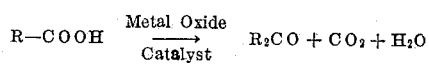

A comparison of the results obtained in the direct conversion process with those obtained in my improved process shows a drop in ketone formation from 3–7% in the direct conversion to less than 0.5% in the process of the present invention.

In the development of the process herein described I have found that when the excess of acid is less than about 15% the rate of ammonia absorption decreases rapidly. Therefore, the amide reactor is operated in accordance with the invention in such manner that the ammonia is completely reacted and the base overflow contains a maximum of 85% amide, the remainder being free acid. The concentration of amide overflowing the base (see drawing) is somewhat critical since increasing the concentration of amide from 85% to 95% decreases the rate at which the ammonia is absorbed by a factor of 3 (i. e. 65–70%). At amide concentrations below 85% there is no noticeable increase in the rate of ammonia absorption. Therefore, we prefer to overflow the base with an amide concentration between 80–85% for maximum efficiency of operation.

The single figure of the drawing is a schematic representation in the nature of a flow sheet illustrating the various steps involved in a typical process carried out in accordance with my invention.

My invention will be more fully understood by reference to the following examples in which I have set forth several of the preferred embodiments of my invention which are included merely for purposes of illustration and not as a limitation thereof.

EXAMPLE I

Propionamide is produced in a continuous manner by reacting gaseous ammonia with propionic acid at a temperature within the range of 180–212° C. and preferably at 200–212° C. Referring to the drawing, the acid is introduced into the middle of a packed distillation column 1 and ammonia is fed into the liquid flash in the base heater 2. The base heater is maintained at a temperature within the range of 200–212° C. and the resulting propionamide-propionic acid mixture containing 80–85% propionamide overflows therefrom and is thereafter introduced into the midsection of distillation column 3.

Ammonium propionate is formed in the flash from base heater 2 by the reaction of ammonia with propionic acid. Under the conditions of operation the ammonium propionate is dehydrated and the water, produced by the dehydration reaction and containing about 5% propionic acid, is distilled off at the top of column 1. The acid-water vapor mixture is condensed in condenser 4, the condensate passing to decanter 5. In the decanter the liquid is separated into an acid layer and a water layer. The acid layer is permitted to flow back to the column as reflux while the water layer is withdrawn and whatever propionic acid it may contain is recovered by flash distillation as the water azeotrope.

The propionamide-propionic acid mixture introduced into column 3 from base heater 2 is stripped of propionic acid which is returned to the feed to column 1. The propionamide is vaporized in the base heater 6 and the vapors thereof introduced directly into the nitrile reactor 7. This reactor is packed with aluminum pellets impregnated with 20% by weight of phosphoric acid and heated to a temperature within the range of 300–600° C., preferably at 400–500° C. In reactor 7 the nitrile is formed in accordance with Equation 2 above. Ammonia is formed by hydrolysis of the amide to the extent of, say, 5–15%, depending upon the temperature and time of contact. The vaporous effluent from reactor 7 is passed to and condensed in condenser 8. The condensate passes to liquid-gas separator 9 at which point the ammonia formed in the hydrolysis of the amide in reactor 7 is bled out of the system and sent to a recovery system to recover the ammonia. The condensate from the vaporous effluent consists essentially of propionitrile, the water of dehydration and small amounts of propionamide and propionic acid. This mixture is then introduced into azeotropic distillation column 10 wherein the propionitrile is removed as an azeotrope with water from the head of the column. The propionitrile product can be decanted at this point and used as such without further purification.

The propionamide and propionic acid content of the mixture introduced into column 10 passes to base heater 11 and is returned directly to the first stage of process by introduction into the propionic acid feed to column 1.

The improvement obtained by the process of the invention herein described will be evident by comparing the results to be obtained in the production of 1,000 pounds of propionitrile by each method. In the direct prior art (one-step) method the production of 1,000 pounds of propionitrile requires 1,458 pounds of propionic acid and 452 pounds of ammonia, whereas by employing the process of my invention only 1,394 pounds of propionic acid and 376 pounds of ammonia are required. As previously indicated, one of the outstanding features of my invention is the elimination or minimization of side reactions in which ketone formation occurs. In the direct dehydration process one encounters ketone formation to the extent of about 2–7%, whereas in the improved process of my invention ketone formation is generally less than 0.5% and usually less than 0.2%

EXAMPLE II

In the same apparatus used for the production of propionitrile, isobutyric acid and ammonia were reacted to form isobutyramide and then dehydrated to the nitrile. The catalyst used was 18% phosphoric acid on zirconia, contact time was 1.62 seconds, and the temperature was 500° C. A 91% conversion to isobutyronitrile was obtained with an ultimate yield of 97%.

It will of course be apparent that a wide variety of dehydration catalysts may be employed in the nitrile-forming reaction. Typical of such catalysts are boron phosphate on alumina, activated alumina, thoria, thoria-alumina, silica-alumina, and aluminum silicate. A preferred catalyst is 10–20% $H_3PO_4$ on $Al_2O_3$, $ZrO_2$, $ThO_2$ or diatomaceous earth.

A comparison of the direct and amide dehydration process are shown in the Table I.

Table I

| Process | Lbs. of Isobutyric Acid per Lbs. of Isobutyronitrile | Lbs. of $NH_3$ per Lbs. of Isobutyronitrile | Percent of Conversion | Percent Yield | Percent Ketone |
|---|---|---|---|---|---|
| Direct Dehydration | 1.30 | 0.280 | 82 | 90.6 | 3.26 |
| Amide Dehyration | 1.20 | 0.252 | 91 | 97.2 | 0.14 |

Acetonitrile, normal butyronitrile, valeronitrile, isovaleronitrile and crotononitrile have been produced in the same manner. In each case the improvements were the same, namely, 1. The recovery and purification of the nitrile was simplified.
2. The capacity of the nitrile reactor was increased by a factor of 2, or more.
3. The formation of ketone was substantially eliminated.
4. Higher conversions and yields were obtained.
5. The acid and ammonia requirements per pound of nitrile produced were reduced.

I claim:

1. A process for the production of an aliphatic nitrile which comprises reacting gaseous ammonia with an aliphatic carboxylic acid containing 2 to 4 carbon atoms at a temperature within the range of about 180–212° C. to form an aliphatic amide-acid mixture, distilling the amide-acid mixture to separate the acid, and thereafter dehydrating the amide in the said mixture to the aliphatic nitrile by passing over a dehydration catalyst.

2. A process for the production of an aliphatic nitrile which comprises reacting gaseous ammonia with an aliphatic carboxylic acid containing 2 to 4 carbon atoms at a temperature of about 180–212° C. to form a mixture containing amide and acid, distilling the amide-acid mixture to separate the acid, and subsequently dehydrating the amide to nitrile by passing the amide over a dehydration catalyst at 300–600° C.

3. The process of claim 2 wherein the amide concentration is 80–85%, and the dehydration catalyst contains 10–20 weight percent phosphoric acid.

4. A process for the production of an aliphatic nitrile which comprises reacting gaseous ammonia with an aliphatic carboxylic acid of from 2 to 4 carbon atoms at a temperature within the range of about 180–212° C. to form an aliphatic amide-acid mixture containing 80–85% of the amide, distilling the amide-acid mixture to separate the acid, and thereafter dehydrating the aliphatic amide by passing over a dehydration catalyst to form the aliphatic nitrile.

5. A process for the production of an aliphatic nitrile which comprises reacting gaseous ammonia with an aliphatic carboxylic acid of 2 to 4 carbon atoms at a temperature within the range of about 180–212° C. to form an aliphatic amide-acid mixture containing 80–85% of the amide, distilling the amide-acid mixture to separate the acid, and thereafter dehydrating the aliphatic amide by passing over a dehydration catalyst at a temperature of 300–600° C. to form the aliphatic nitrile.

6. A process for the production of propionitrile which comprises reacting gaseous ammonia with propionic acid at a temperature within the range of about 180–212° C. to form a propionamide-propionic acid mixture, distilling the amide-acid mixture to separate the acid, and thereafter dehydrating the propionamide in the said mixture to propionitrile by passing over a dehydration catalyst.

7. A process for the production of propionitrile which comprises reacting gaseous ammonia with propionic acid at a temperature within the range of 180–212° C. to form a propionamide-propionic acid mixture containing 80–85% of the propionamide, distilling the amide-acid mixture to separate the acid, and thereafter dehydrating the propionamide to form propionitrile by passing over a dehydration catalyst.

8. A process for the production of propionitrile which comprises reacting gaseous ammonia with propionic acid at a temperature within the range of about 180–212° C. to form a propionamide-propionic acid mixture containing 80–85% of the propionamide, distilling the amide-acid mixture to separate the acid, and thereafter dehydrating the propionamide by passing over a dehydration catalyst at a temperature of 300–600° C. to form propionitrile.

9. A process for the production of propionitrile which comprises reacting gaseous ammonia with propionic acid at a temperature within the range of about 180–212° C. to form a propionamide-propionic acid mixture containing 80–85% of the propionamide, distilling the amide-acid mixture to separate the acid, and thereafter dehydrating the propionamide by passing over a catalyst composed of alumina impregnated with 20% by weight phosphoric acid at a temperature of 300–600° C. thereby to form the nitrile.

References Cited in the file of this patent

UNITED STATES PATENTS

| | | |
|---|---|---|
| 2,061,314 | Ralston et al. | Nov. 17, 1936 |
| 2,300,291 | Jolly | Oct. 27, 1942 |
| 2,314,894 | Potts et al. | Mar. 30, 1943 |
| 2,526,044 | Ralston et al. | Oct. 17, 1950 |